INVENTORS
ALBERT D. WEINER
ANTHONY A. STYNER
BY Harvey S. Boyd
ATTORNEY

United States Patent Office 3,390,496
Patented July 2, 1968

3,390,496
DISINTEGRATING CEMENTITIOUS
CASTING PASTE
Albert D. Weiner, 12—21 Bellair Ave., Fairlawn, N.J. 07410, and Anthony A. Styner, 405 W. 57th St., New York, N.Y. 10019
Filed June 21, 1966, Ser. No. 560,380
12 Claims. (Cl. 52—232)

ABSTRACT OF THE DISCLOSURE

This disclosure relates to a cementitious disintegrating paste of particular use in the casting of concrete and ornamental relief-type stonework. The paste hereinafter described may function in a casting operation by holding ornamental material such as aggregate in a desired orientation on a mold wall while concrete is poured into the mold and hardens. The paste disintegrates after the forms are removed leaving the aggregate embedded at a preselected depth and orientation on the surface of the concrete casting.

---

The invention described herein may be manufactured and used by or for the Government for governmental purposes without the payment to us of any royalty thereon.

The paste comprises a mixture of a very finely ground cementitious material such as bentonite, sodium silicate, or plaster of Paris; a material that sublimes at room temperature such as para-dichlorbenzene or naphthalene crystals ground to pass through a number 12, 16, or 50 sieve; and sufficient evaporative vehicle to form a paste. Inert filler such as sawdust, sand, or perlite and plasticizers and stabilizing agents may be added to modify the strength of the paste. However, the inclusion of a material which evaporates or sublimes at room temperature lends the disintegrating quality to the paste due to a loss of internal cohesion through the sublimation of a major ingredient. Use of this unique paste facilitates the casting of concrete having an ornamental surface in relief without the necessity of sand blasting or bush hammering the concrete to obtain indentations or expose aggregate.

The paste of this invention, when in a plastic consistency, may be applied or shaped to surfaces, receptacles, grooves, contours, and enveloped around other elements. The paste additionally hardens in a predetermined time to a useful strength, and upon exposure to air, degrades in a predetermined time, weakens, and gradually disappears.

The paste will adhere to wooden, plastic, or metallic surfaces, in addition to concrete.

The cementitious component of the paste may be defined as a cement, plaster or like binding material used in building structures. This material may be Portland cement or any high early strength cement, gypsum, clay, or other powdered material which will solidify by chemical action or by drying after having been made plastic with any evaporative solvent or vehicle such as water or methylene chloride.

The disintegrating paste of this invention has the strength to hold partially embedded aggregate on a form wall when said form is in a horizontal, vertical, or angled position, while concrete is poured into the form, and during the vibration thereof.

The paste sets quickly and adheres to concrete. Disintegration of the paste is not noticeable visually until about 18 days after the initial set. Therefore, the paste possesses the additional capability of intimately coating concrete with an initial high strength layer, impervious to water vapor. The invention contemplates a variety of uses whereby a layer of a predetermined thickness on a concrete surface disintegrates approximately 18 days after the initial construction thereof.

The paste, in addition, may be used without aggregate to facilitate the stripping of forms, or between plastic concrete to eliminate sawing joints. The various structural and ornamental applications of this paste with concrete are further enhanced due to the fact that the paste may be used in on-site pours or in a casting factory. The paste also has moisture retentive qualities which make it an excellent curing agent for concrete.

Accordingly, it is an object of this invention to provide a disintegrating form coating for concrete casting and ornamental relief-type stonework.

It is another object to provide a method of casting concrete and ornamental relief-type stonework whereby a composite layer of the curing material disintegrates to a predetermined depth after the removal of the casting forms.

It is still another object to provide a form coating capable of retaining ornamental materials partially embedded therein during casting operations until said materials have become set in the casting material whereupon said coating disintegrates.

It is a further object to provide a method of casting concrete articles having an ornamental design in relief on a surface thereof wherein said design is partially embedded in a disintegrating form coating which adheres to the concrete after the removal of the forms, said design being taken by the concrete while hardening whereupon said coating disintegrates.

These and other objects will become apparent with reference to the drawings wherein.

A preferred composition of the paste of this invention comprises 95 percent by weight, of ground para-dichlorbenzene and 5 percent by weight powdered bentonite ground together with sufficient evaporative vehicle to make a paste from the dry mixture.

Another preferred composition comprises a weight percent of 80–90 percent para-dichlorbenzene and 10–20 percent plaster of Paris in sufficient evaporative vehicle to make a paste.

With reference to the drawings and the following examples, utilization of the disintegrating paste of this invention with concrete castings is specifically described. The following examples are illustrative only, and are not intended to eliminate equivalent methods of application.

Example 1

Figure 1:
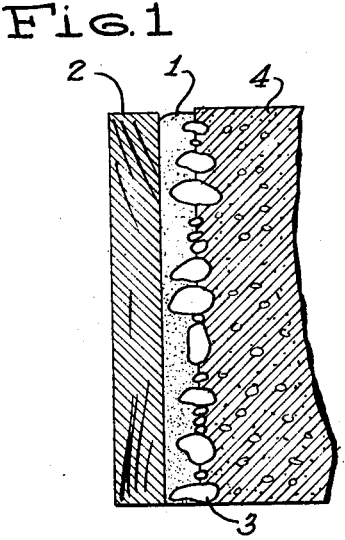
FIG. 1 represents a cross-section of a casting including an ornamental stone facing immediately after the concrete is poured into forms coated with the disintegrating paste of this invention and aggregate.
Figure 2:
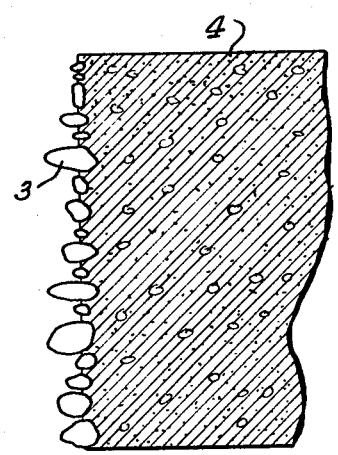
FIG. 2 represents the casting of FIG. 1 after removal of the forms and disintegration of the paste.
Figure 3:
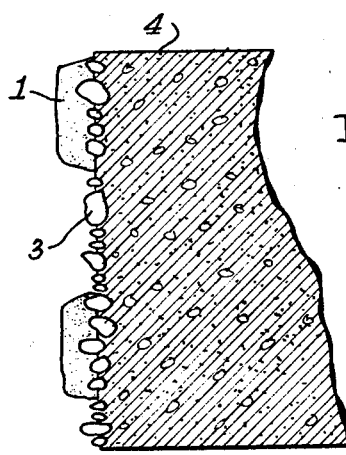
FIG. 3 represents the casting of FIG. 1 after removal of the forms and partial disintegration of the paste.

Referring specifically to FIGS. 1, 2, and 3, the paste 1 may be spread in a predetermined thickness over the inner face of a form 2. Ornamental material 3 may then be selectively positioned in the paste after the paste has plasticized. The paste is then allowed to dry. After the paste coating 1 dies, concrete 4 is poured into and vibrated in the form 2 in the conventional manner. The concrete is allowed to set until it has sufficient strength to retain the ornamental material 3, or for about three days. The form walls 2 are then stripped off and the casting allowed to age. During the aging process the paste 1 disintegrates as shown in FIG. 3. Approximately eighteen days after casting the paste should have completely disintegrated, exposing the ornamental material. Any excess dust remaining at this point may be easily removed from the casting with a brush or a hose.

The time required for complete disintegration of the paste depends on the composition thereof. With the increase of the subliming ingredient in the paste mixture the time for disintegration decreases, but the strength of the paste mixture also decreases.

Reinforcing steel mesh of lath attached to the form wall may be covered with paste prior to embedding ornamental material therein in order to strengthen the paste, or an inert filler may be mixed with the paste.

*Example 2*

Figure 4:
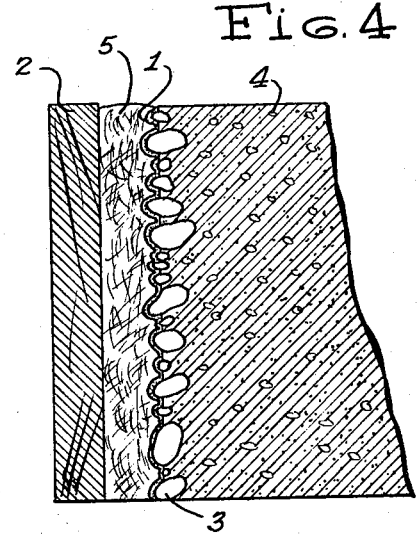
FIG. 4 represents a casting including an ornamental stone facing molded in a form having an inner layer of foamed material, a coating of disintegrating paste and ornamental stone embedded therein.

A partially resilient material 5 such as foamed polyurethane, may be used to support the paste 1 and aggregate 3, as shown in FIG. 4. Such foamed material may be fastened to the form wall 2 and coated with the paste. Aggregate or other design material 3 may then be positioned on the paste. Pressure should be applied to the design material to embed the material a predetermined depth in the foamed base. The paste coating will glue the design to the base material during casting. About three days after pouring the concrete 4 into the resulting mold, the form wall 2 and foamed base 5 may be stripped from the casting. The foamed base readily separates from the aggregate due to the partial disintegration of the paste coating.

*Example 3*

Figure 5:
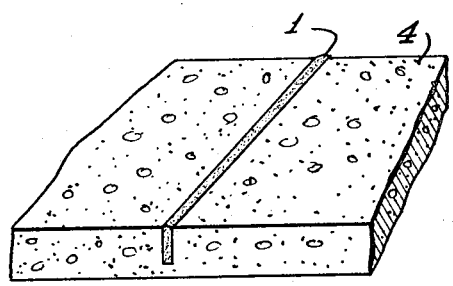
FIG. 5 represents a concrete mass having a disintegrating paste joint.

The paste may also be used to form a disintegrating joint 1 for concrete 4 as shown in FIG. 5, thereby eliminating the necessity for sawing. A joint form should be constructed and lined with paper. The paste is then poured into the form and allowed to harden until it will retain the configuration of the form. After the joint 1 hardens and is removed from its form, it may be inserted in freshly poured concrete 4. The joint will remain rigid until the concrete hardens and, upon disintegration, in approximately eighteen days, the effect of a saw joint in the concrete will be achieved without the physical operation of sawing the hardened concrete.

We claim:

1. A disintegrating cement comprising the dry mixture of approximately 95 percent by weight of finely granulated paradichlorbenzene and approximately 5 percent by weight of powdered bentonite.

2. A disintegrating cement comprising the dry mixture of 10–20 percent plaster of Paris by weight and 80–90 percent para-dichlorbenzene.

3. In a structure comprising mutually spaced masses of material set in predetermined positions, a disintegrating, cementitious mixture including a volatile component separating the masses.

4. In a concrete mass a preset, disintegrating cementitious paste joint of predetermined dimensions, said paste comprising approximately 95 percent by weight of finely granulated para-dichlorbenzene and approximately 5 percent by weight powdered bentonite in sufficient solvent to make a paste, disposed in said mass before said mass hardens.

5. A disintegrating form coating for use in casting concrete consisting essentially of the mixture of approximately 95 percent by weight of finely granulated para-dichlorbenzene and approximately 5 percent by weight of powdered bentonite in sufficient solvent to make a paste.

6. A cementitious disintegrating form coating for retaining ornamental design material partially embedded therein during the casting of concrete in the form, for carrying the design material in intimate contact with a surface of the cast concrete until said concrete surface has sufficient strength to retain said design, comprising the mixture of:
(a) a finely granulated disintegrating material, selected from the group consisting of para-dichlorbenzene and naphthalene;
(b) a powdered cementitious material, selected from the group consisting of bentonite and sodium silicate, said disintegrating material and cementitious material in the weight ratio of approximately 95 parts to 5 parts; and
(c) sufficient solvent to make a paste.

7. The mixture of claim 6 further comprising a filler selected from the group consisting of sawdust, sand, and perlite, for strengthening the internal cohesive characteristics of said mixture.

8. The coating of claim 6 wherein the powdered cementitious material comprises plaster of Paris, and the disintegrating material comprises para-dichlorbenzene in the ratio of 10–20 percent plaster of Paris to 80–90 percent para-dichlorbenzene in sufficient water to make a paste.

9. A method of constructing a concrete structure having an ornamental design material in relief on a surface thereof comprising the steps of:
(a) selectively positioning a form to contain a concrete mass;
(b) coating an inner surface of said form with a disintegrating paste comprising a mixture of approximately 95 percent by weight of finely granulated para-dichlorbenzene and approximately 5 percent by weight of powdered bentonite in sufficient solvent to form a paste;
(c) positioning an ornamental design material partially embedded in said paste to a predetermined depth and in a predetermined configuration;
(d) pouring concrete into said form enveloping the exposed portion of said design material;
(e) allowing said concrete to harden until the configuration of said form and paste, and said ornamental design material is retained by said concrete without the support of said form;
(f) stripping said form from said hardened concrete; and
(g) allowing said paste to disintegrate leaving said hardened concrete retaining said design material partially embedded in a surface thereof.

10. The method of claim 9 further comprises covering an inner surface of said form with a foamed material, capable of being deformed and retaining an impression coating said material with said disintegrating paste, and pressing said ornamental design material a predetermined depth into said paste and foamed material so that said design material is partially embedded in said foamed material.

11. The method of claim 10 wherein said foamed material comprises polyurethane.

12. The method of claim 9 wherein the disintegrating paste comprises a mixture of 10–20 percent by weight plaster of Paris and 80–90 percent by weight para-dichlorbenzene in sufficient water to make a paste.

References Cited

UNITED STATES PATENTS

| | | | |
|---|---|---|---|
| 985,353 | 2/1911 | Landis | 264—261 |
| 1,169,985 | 2/1916 | Mickelson | 52—315 X |
| 1,809,504 | 6/1931 | Carvel | 264—256 X |
| 1,691,721 | 11/1928 | Johnson | 52—315 X |
| 1,916,308 | 7/1933 | Grieco | 52—315 X |
| 2,004,545 | 6/1935 | Wolf et al. | 106—75 |
| 3,331,175 | 7/1967 | Terrio | 52—315 |

FRANK L. ABBOTT, *Primary Examiner.*

HENRY C. SUTHERLAND, *Examiner.*

C. G. MUELLER, *Assistant Examiner.*